(12) United States Patent
Koch et al.

(10) Patent No.: US 11,207,604 B1
(45) Date of Patent: Dec. 28, 2021

(54) SYSTEMS AND METHODS TO INCENTIVIZE PARTICULAR IN-GAME USER BEHAVIORS AND PARTICULAR USER ACTIVITIES WITHIN AN ONLINE GAME

(71) Applicant: Mythical, Inc., Sherman Oaks, CA (US)

(72) Inventors: Rudy Koch, Sammamish, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/185,773

(22) Filed: Feb. 25, 2021

(51) Int. Cl.
| | | |
|---|---|---|
| A63F 13/85 | (2014.01) | |
| A63F 13/69 | (2014.01) | |
| A63F 13/79 | (2014.01) | |
| A63F 13/73 | (2014.01) | |
| A63B 71/06 | (2006.01) | |
| A63B 24/00 | (2006.01) | |
| A63F 13/87 | (2014.01) | |
| A63F 13/795 | (2014.01) | |
| G07F 17/32 | (2006.01) | |

(Continued)

(52) U.S. Cl.
CPC .......... *A63F 13/85* (2014.09); *A63B 24/0062* (2013.01); *A63B 71/0622* (2013.01); *A63F 13/60* (2014.09); *A63F 13/69* (2014.09); *A63F 13/73* (2014.09); *A63F 13/79* (2014.09); *A63F 13/795* (2014.09); *A63F 13/87* (2014.09); *G06Q 50/01* (2013.01); *G07F 17/326* (2013.01); *G07F 17/3288* (2013.01); *A63B 2024/0065* (2013.01); *A63F 2300/575* (2013.01)

(58) Field of Classification Search
None
See application file for complete search history.

(56) References Cited

U.S. PATENT DOCUMENTS 8,272,961 B2   9/2012   Busey
9,440,151 B2   9/2016   Van Luchene
(Continued)

OTHER PUBLICATIONS

GameFaqs, "How do you bet pink slips?" https://gamefaqs.gamespot.com/ps2/938452-juiced-2-hot-import-nights/answers/190010-how-do-you-bet-pink-slips. Created 2010. (Year: 2020) 1 page.
(Continued)

*Primary Examiner* — Jason T Yen
(74) *Attorney, Agent, or Firm* — Esplin & Associates, PC

(57) ABSTRACT

Systems and methods to enable users to incentivize particular in-game user behaviors and particular user activities within an online game are disclosed. Exemplary implementations may: effectuate presentation of an incentive interface that enables a first user to define a social agreement of a set of activities for a second user to perform and incentives for the set of activities that the second user can earn, and specify the second user to propose the social agreement to; effectuate presentation of the social agreement to the second user via an online gaming platform; receive an indication of acceptance to the social agreement; generate instructions to form the social agreement as a smart contract and transfer such to a decentralized ledger server for recordation; and receive indication of execution of the set of activities and, in responsive, provide the incentives to the second user.

14 Claims, 4 Drawing Sheets

(51) Int. Cl.
  *G06Q 50/00* (2012.01)
  *A63F 13/60* (2014.01)

(56) References Cited

U.S. PATENT DOCUMENTS

| | | |
|---|---|---|
| 10,518,178 B1 | 12/2019 | Cunningham |
| 10,850,202 B1 | 12/2020 | Koch |
| 10,861,095 B1 | 12/2020 | Koch |
| 10,984,400 B1 | 4/2021 | Koch |
| 11,138,580 B1 | 10/2021 | Koch |
| 11,141,664 B1 | 10/2021 | Koch |
| 2001/0018366 A1 | 8/2001 | Shimomura |
| 2003/0109299 A1 | 6/2003 | Reizei |
| 2004/0147308 A1 | 7/2004 | Walker |
| 2006/0017229 A1 | 1/2006 | Hayakawa |
| 2006/0258463 A1 | 11/2006 | Cugno |
| 2007/0191103 A1 | 8/2007 | Van Luchene |
| 2008/0033734 A1 | 2/2008 | Carry |
| 2008/0070689 A1 | 3/2008 | Van Luchene |
| 2008/0139318 A1 | 6/2008 | Van Luchene |
| 2008/0167122 A1 | 7/2008 | Maeda |
| 2008/0227512 A1 | 9/2008 | Lang |
| 2012/0290977 A1* | 11/2012 | Devecka ............... G06Q 10/10 715/810 |
| 2013/0143670 A1 | 6/2013 | Junkin |
| 2013/0288788 A1 | 10/2013 | Lim |
| 2014/0045586 A1* | 2/2014 | Allen ................. G07F 17/323 463/25 |
| 2014/0206452 A1* | 7/2014 | Bambino ............... A63F 13/69 463/40 |
| 2015/0001799 A1 | 1/2015 | Cullen |
| 2015/0163311 A1* | 6/2015 | Heath ................ G06Q 30/0236 709/204 |
| 2015/0371499 A1* | 12/2015 | Sansregret .......... G07F 17/3244 463/25 |
| 2018/0304159 A1 | 10/2018 | Campos |
| 2019/0180329 A1* | 6/2019 | Chetlur ................ H04L 9/3239 |
| 2019/0197831 A1 | 6/2019 | Batton |
| 2019/0236594 A1 | 8/2019 | Ehrlich-Quinn |
| 2019/0282906 A1 | 9/2019 | Yong |
| 2019/0299105 A1 | 10/2019 | Knight |
| 2019/0311341 A1 | 10/2019 | Rice |
| 2020/0155944 A1 | 5/2020 | Witchey |
| 2020/0202668 A1 | 6/2020 | Cotta |
| 2020/0294133 A1 | 9/2020 | Cella |
| 2020/0311721 A1 | 10/2020 | Ow |
| 2020/0320644 A1* | 10/2020 | Hollis ................ G06Q 30/0258 |
| 2020/0357246 A1* | 11/2020 | Nelson ................ G07F 17/3251 |
| 2021/0019987 A1* | 1/2021 | Cohen ................ G07F 17/3225 |
| 2021/0027281 A1 | 1/2021 | Kilroe |
| 2021/0042830 A1 | 2/2021 | Burke |
| 2021/0118085 A1 | 4/2021 | Bushnell |

OTHER PUBLICATIONS

GauthierDickey & Ritzdorf, in "Secure Peer-to Peer Trading for Multiplayer Games," IEEE (Year: 2012).

* cited by examiner

Social Agreement Form

Activities:

Activities for user group governed by *group agreement 800* to execute:

- ☐ Collect [ ## ] of [ *virtual item type* ]
- ☐ Increase time spent playing      at [ *specific time* ]
- ☐ Conquer [ Level / opponent ⌄ ]
- ☐ Discover [ *virtual item* ]
- ☐ Increase time spent on platform by __
- ☒ Conquer [ Level / opponent ⌄ ] in [ *time* ]
- ☒ Build [ object ⌄ ]
- ☐ Other __

312

Incentive:

☒ [ Inventory: ⌄ ]
    Virtual item A
    Virtual item B
    Virtual item C

☐ Virtual currency [ ]

+ add bonus incentive    313

314

Send to user(s): <second user>     [ Send 316 ]

SYSTEMS AND METHODS TO INCENTIVIZE PARTICULAR IN-GAME USER BEHAVIORS AND PARTICULAR USER ACTIVITIES WITHIN AN ONLINE GAME

FIELD OF THE DISCLOSURE

The present disclosure relates to systems and methods to enable users to incentivize one or more of particular in-game user behaviors and particular user activities for other users within an online game.

BACKGROUND

Online gaming platforms are known. Users of online gaming platforms exchanging digital in-game assets with other users is known. Distributed ledgers are known techniques to produce a secure record or registry of ownership of assets, transactions, and other information. For example, a distributed blockchain is a distributed ledger.

SUMMARY

One aspect of the present disclosure relates to a system configured to enable users to incentivize one or more of particular in-game user behaviors and particular user activities for other users within an online game. The system may include one or more hardware processors configured by machine-readable instructions, incentive interfaces, online gaming platforms, decentralized ledger servers, and/or other components. Machine-readable instructions may include one or more instruction components. The instruction components may include one or more of an incentive interface component, a presentation effectuation component, an instruction initiation component, an incentive providing component, an instructions component, and/or other instruction components.

The incentive interface component may be configured to effectuate presentation of an incentive interface that enables a first user to: (a) define a set of activities for a second user to perform, (b) define an incentive for the set of activities that the second user earns for performance of the set of activities, (c) specify the second user to propose the set of activities and the incentive to, and (d) initiate transmission of a social agreement to a client computing platform associated with the second user. The social agreement may correspond to the set of activities and the incentive defined.

The presentation effectuation component may be configured to effectuate presentation of the social agreement to the second user. Presentation of the social agreement may be effectuated via the online gaming platform.

The instruction initiation component may be configured to receive indication of acceptance to form the social agreement. The indication of acceptance may be received from the client computing platform associated with the second user. The instruction initiation component may be configured to generate, responsive to receipt of the indication, a set of instructions to form the social agreement as a smart contract. The instruction initiation component may be configured to transfer the set of instructions to a decentralized ledger server.

The incentive providing component may be configured to receive performance information indicating performance of the set of activities by the second user. The incentive providing component may be configured to provide, responsive to the receipt of the performance information, the incentive to the second user in accordance with the social agreement.

The decentralized ledger server may be configured by machine-readable instructions that include the instructions component. The instructions component may be configured to receive and execute the set of instructions to record the social agreement on the blockchain as the smart contract.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 3 illustrates an example implementation of an incentive interface, as may be used by a system configured to enable users to incentivize one or more of particular in-game user behaviors and particular user activities for other users within an online game, in accordance with one or more implementations.

DETAILED DESCRIPTION

Figure 1:
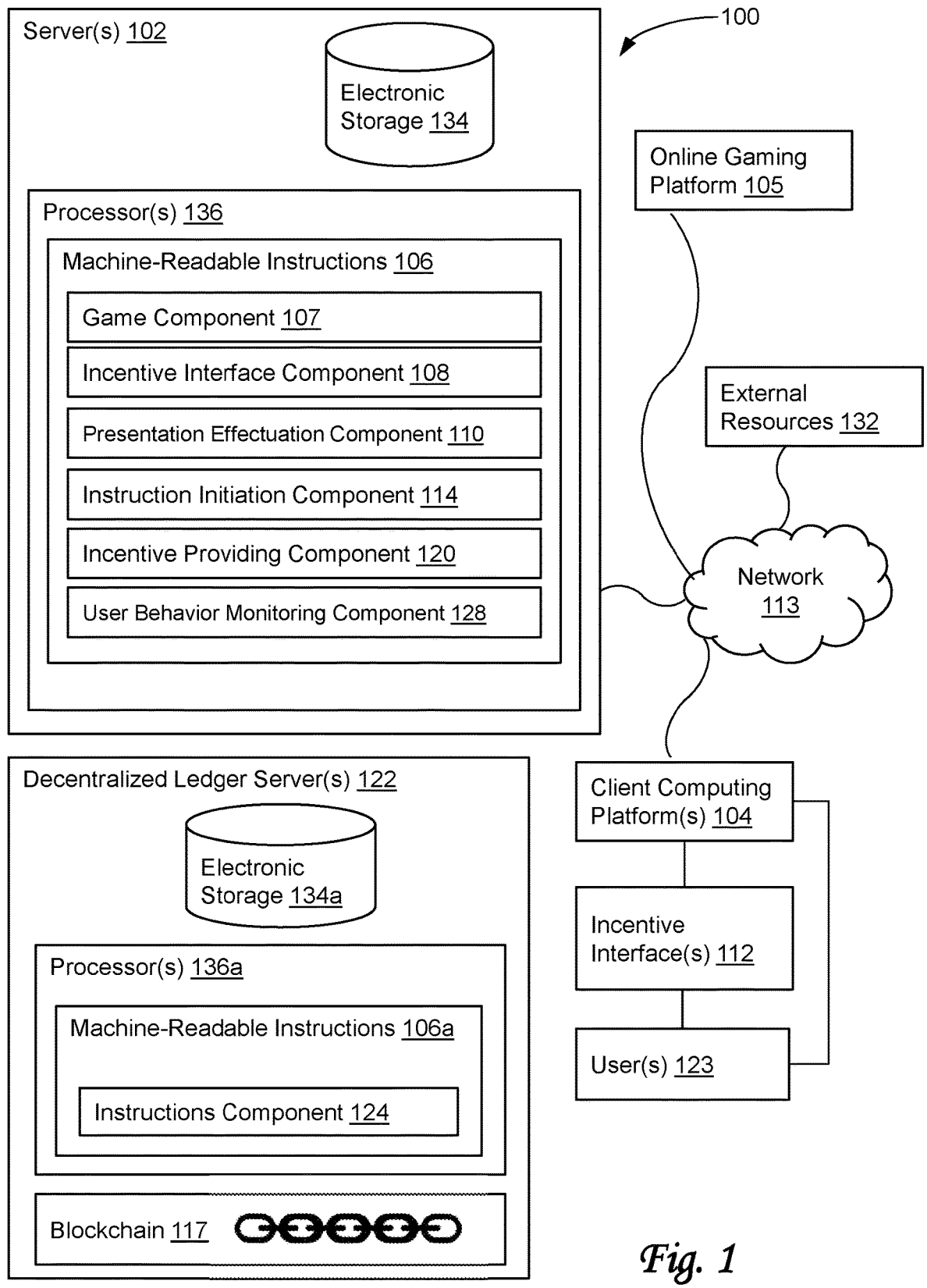
FIG. 1 illustrates a system configured to enable users to incentivize one or more of particular in-game user behaviors and particular user activities for other users within an online game, in accordance with one or more implementations.

FIG. 1 illustrates a system 100 configured to enable users to incentivize one or more of particular in-game user behaviors and particular user activities for other users within an online game, in accordance with one or more implementations. System 100 may include one or more servers 102, incentive interfaces 112, decentralized ledger server(s) 122, one or more client computing platform(s) 104, online gaming platforms 105, one or more external resources 132, and/or other components. Users 123 (also referred to as players) may include one or more of a first user, a second user, a third user, a fourth user, and/or other users. As used in descriptions herein, any use of the term "user" may refer to user(s) 123. Electronic storage 134a may be similar to electronic storage 134 as described elsewhere in this disclosure, though included in decentralized ledger servers 122.

Instances of online games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital assets (e.g., characters, weapons, resources, etc.) to users 123 of online gaming platform 105. In some implementations, individual players may own individual virtual items, and exchange these items with other individual players. Due to an exchange, ownership rights of a digital asset may transition from an original owner to a new owner (even if there may, in some implementations, be one or more intermediary and/or temporary owners during the process of performing the exchange). In some implementations, digital assets may be associated with other rights than ownership rights, such as, by way of non-limiting example, distribution rights.

In some implementations, distribution rights of digital assets may reflect rights held by the individual ones of the users to receive certain distributions of benefits upon exchanges involving particular digital assets. That is, the individual users may own/hold rights to particular digital assets that guarantee them benefits upon (future) exchanges involving those digital assets regardless of whether the individual users owns/hold the ownership rights for those digital assets. In some implementations, the distribution gains may result from a particular action or activity (such as, e.g., a sale of a particular digital asset), e.g., within the online gaming platform 105, of a particular digital asset. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the users that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital assets.

In some implementations, the digital assets may include and/or be virtual items that are not fungible and may be usable within an online gaming platform 105. In some implementations, the digital assets may represent three-dimensional in-game user-controllable characters that can interact with other (in-game) virtual items within online gaming platform 105. By way of non-limiting example, digital assets may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within gaming platform 105 that a user may use, own, sell, trade, destroy, and/or otherwise effectuate a change of ownership of.

As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual CryptoKitty™ may be a non-fungible digital asset. A digital asset may be semi-fungible if there is a set of a limited number of similar but distinguishable digital assets. For example, a limited-edition Blanko™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, digital assets may be usable within one or more games.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, system 100 and/or decentralized ledger server(s) 122 may be configured to communicate with one or more of online gaming platform(s) 105, users 123, and/or other entities and/or components. Users 123 may include players who play and/or otherwise interact on online gaming platform 105.

Decentralized ledger server(s) 122 may include one or more of electronic storage 134a, processor(s) 136a, machine-readable instructions 106a, blockchain 117, and/or other components. Machine-readable instructions 106a may include one or more instruction components. The instruction components may include computer program components. The instruction components may include one or more of an instructions component 124 and/or other instruction components.

In some implementations, blockchain 117 may be maintained by a distributed computing platform (not shown in FIG. 1). In some implementations, the distributed computing platform may be implemented by a set of client computing platforms and/or servers (including, for example, one or more decentralized ledger servers 122). The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 117. The smart contracts may be stored on blockchain 117. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Server(s) 102 may include electronic storage 134, processor(s) 136, machine-readable instructions 106, and/or other components. Processor(s) 136a may be similar to processor(s) 136 as described elsewhere in this disclosure, though included in decentralized ledger servers 122. Machine-readable instructions 106a may be similar to machine-readable instructions 106 as described elsewhere in this disclosure, though included in decentralized ledger servers 122. Server(s) 102 may be configured by machine-readable instructions 106. Machine-readable instructions 106 may include one or more instruction components. The instruction components may include computer program components. The instruction components may include one or more of a game component 107, an incentive interface component 108, a presentation effectuation component 110, an instruction initiation component 114, an incentive providing component 120, an instructions component 124, a user behavior monitoring component 128, and/or other instruction components.

In some implementations, game component 107 may be configured to execute, via online gaming platform 105, an instance of a game. The instance of the game may facilitate presentation of the game to users 123. For example, the instance of the game may be an online game executed with online gaming platform 105. Game component 107 may be configured to implement in-game actions in the instance of the game in response to action requests for the in-game actions by the users. In some implementations, game component 107 may be arranged, organized, and/or otherwise included in online gaming platform 105. As used herein, the term "game" may refer to one or more games within gaming platform 105. In some implementations, the game may be provided via a virtual space, and may include a plurality of resource types and/or maps.

The presentation of the game may be based on the views of the game that are determined during execution of the game. In some implementations, the view may be communicated (e.g., by streaming, via object/position data, and/or other information) from decentralized ledger server(s) 122 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). In some implementations, user-controlled characters may be capable of locomotion within the topography of the simulated space that is included in the instance of the game. In some implementations, user-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. By way of non-limiting illustration, users 123 may include the first user and the second user that interact with online gaming platform 105. The first user and the second user may control digital assets (e.g., characters) in a game hosted by online gaming platform 105. In some implementations, user inventories may be managed using blockchain 117. For example, ownership rights (and/or other types of rights) of individual virtual items included in an individual user inventory may be recorded on blockchain 117. In some implementations, individual user inventories may correspond to individual smart contracts stored on blockchain 117.

Incentive interface component 108 may be configured to effectuate presentation of incentive interfaces 112 that enables users 123 to define social agreements. Incentive interface 112 may be presented within or outside online gaming platforms 105. Incentive interface 112 may include one or more user interface elements. The user interface elements may be configured to facilitate user interaction with incentive interface 112, and/or to facilitate user entry, and/or selections to define the social agreements. By way of non-limiting example, the user interface elements may include one or more of text input fields, drop down menus, check boxes, display windows, virtual buttons, and/or other user interface elements.

The social agreements may be agreements amongst users 123 to incentivize particular activities within online gaming platform 105. The social agreements may be defined by users 123 to be presented to one or more particular users. The social agreements may include a set of activities for the one or more particular users to perform and an incentive that can be earned by one or more particular users upon performance of the set of activities. Thus, users 123 may incentivized their peers, i.e., the one or more particular users, to perform proposed activities and/or change their behavior patterns within online gaming platforms 105.

Incentive interfaces 112 may enable users 123, e.g., a first user, to define the set of activities for, e.g., a second user, to perform. By way of non-limiting example, the set of activities may include one or more of collecting a particular amount or number of a particular virtual item within the online gaming platform, collecting a particular amount or number of a particular type of virtual item within the online gaming platform, attempting to complete a particular level or beat a particular opponent of a game within the online gaming platform, discovering a given virtual item within the online gaming platform, decreasing amount of time spent playing a particular level of a game to a particular amount of time, building a particular virtual object, and/or other activities within the online gaming platform. In some implementations, a single user may use individual social agreements to incentivize individual other users. In some implementations, a single user may use individual social agreements to incentivize groups of multiple other users. For example, a social agreement may define an activity that is to be performed and/or accomplished by multiple users. For example, a social agreement may define an activity that is to be performed and/or accomplished collaboratively. For example, a particular social agreement may define an activity that is to be performed and/or accomplished by all the other users that are part of the particular social agreement.

In some implementations, the set of activities may include changes in behavior patterns of the users. Behavior patterns may include actions performed by the users within a virtual space of a game. The user behavior patterns may include individual ones of the actions, sets of actions, ordered sets of actions, and/or multiple of the individual actions, the sets of actions, and the ordered set of actions. The actions may include one or more of a purchase, a sale, a trade, a selection of a user interface element, engagement with (particular) virtual content, communication with particular users 123, completion of particular tasks, a particular frequency of interaction with particular virtual items, formation of alliances with users 123, and/or other actions performed (or performable) by the users.

The changes in the behavior patterns may include adjusting (i.e., increasing or decreasing) time spent on a particular user interface, adjusting amount of time of sessions of the game, adjusting times of the sessions of the game (e.g., 9 PM to 12 AM), increasing time spent on the online gaming platform 105, increasing time spent playing the game via online gaming platform 105 during a particular time of day (e.g., 8 PM to 10 PM), increasing time spent playing a particular level of the game via online gaming platform 105, increasing in-game victories frequency (e.g., winning 60% of games played), changes in the individual actions of the users, the sets of actions, the ordered sets of actions, and/or other changes in the behavior patterns. Adjusting the time spent, such on online gaming platform 105, playing the game, playing the particular level, etc., may include time parameter value within which the time is to be increased or decreased and an adjustment parameter value by which the time is increased or decreased by. For example, the time parameter value may be one day, three days, one week, one month, or other time parameter values. The adjustment parameter value may be a particular amount of time (e.g., 4 hours) or a percentage (e.g., 10%). As such, by way of non-limiting illustration, to perform the change in the behavior, a user must increase their time spent on online gaming platform 105 within three days (i.e., the time parameter value) by 20% (i.e., the adjustment parameter value).

In some implementations, incentive interfaces 112 may enable the users 123 to specify other changes in the behavior patterns so that the other users 123 may perform the behavior patterns and/or activities (e.g., same as the activities). In some implementations, particular ones of the user interface elements may facilitate the selection and/or entry of one or more of the activities and the changes to the behavior patterns to be the set of activities for the social agreement.

Incentive interfaces 112 may enable the users to define the incentive for the set of activities that the one or more other users earn for performance of the set of activities. The incentive may encourage the other users, e.g., the second user, to execute the set of activities. The incentive may be one or more of in-game currency and in-game virtual items held by user 123 (e.g., the first user) in an inventory, and/or particular ones of the distribution gains. By way of non-limiting example, one or more of in-game currency and in-game virtual items may be in a user inventory associated with the first user. The particular distribution gains may be related to particular in-game virtual items that the first user holds the distribution rights to. The distribution gains received from the particular in-game items as the incentive may be for a particular amount of time (e.g., one week of distribution gains from a first virtual in-game item) or a particular amount of transactions involving the particular in-game items (e.g., up to five transactions involving the first virtual in-game item).

In some implementations, instructions component 124 may be configured to receive and place the incentive defined via incentive interface 112 into a smart contract. Instructions component 124 may receive the incentive for placement into the smart contract upon (or subsequent to) definition of the incentive. In some implementations, instructions component 124 may receive the incentive for placement into the smart contract upon transmission of the social agreement to other user 123. The smart contract may be recorded to blockchain 117. The smart contract may ensure that the incentive the first user defines is secured for the second user upon performance of the set of activities. The smart contract may be executed to provide the incentive to the second user responsive to receipt of performance information indicating that the second user performed the set of activities or part thereof, or responsive to actions performed by incentive providing component 120 and/or other components of system 100.

Incentive interfaces 112 may enable users 123 to specify other users 123 to propose the set of activities and the incentive to as the social agreement. Other users 123 may be peers within online gaming platform 105. For example, the second user may be a peer of the first user. In some implementations, users 123 may specify other users 123 to propose the set of activities and the incentive to by entering names of the users, usernames, avatar names, and/or other names associated with users 123. In some implementations, specifying other users 123 for the social agreements may be limited to a particular amount of users at once (e.g., only one user, maximum of 3 users, etc.).

Incentive interfaces 112 may enable users 123 to initiate transmission of the social agreements to client computing platforms 104 associated with other users 123. For example, incentive interface 112 may enable the first user to initiate transmission of the social agreement to client computing platform 104 associated with the second user. The social agreement may correspond to the set of activities and the incentive defined by users 123 (e.g., the first user). In some implementations, the transmissions of the social agreements may be initiated by selection of a particular one of the user interface elements (e.g., a virtual button). The social agreements may be transmitted to particular client computing platforms 104 via network 113.

In some implementations, incentive interface 112 may enable selection and/or entry of one or more bonus incentive for other users 123, a bonus trigger that causes dispersion/providing of the bonus incentive, a message, and/or other information. Particular ones of the user interface elements may facilitate such selection and/or entry (e.g., text boxes, dropdown menus, etc.). The bonus incentive may be added incentives for other users 123 to perform the set of activities or particular activities of the set of activities in accordance with the social agreements within a particular amount of time or by a particular time. Selection/entry of the bonus trigger may include defining a bonus timing value, particular ones of the set of activities, a particular number of activities to perform from the set, and/or other information related to the bonus incentive. The bonus timing value may refer to an amount of time within which users 123 are to perform the set of activities or a date and time by which users 123 are to perform the set of activities to receive the bonus incentive.

For example, in some implementations, the bonus incentive may be one or more of a virtual item, virtual currency, and/or other bonus incentives. The bonus triggers may include performance of the set of activities within the bonus timing value or particular ones thereof, performance of the set of activities by the bonus timing value or particular ones thereof, performance of a particular amount of activities from the set of activities within the bonus timing value, performance of a particular amount of activities from the set of activities by the bonus timing value, and/or other bonus triggers. In some implementations, the bonus incentive may be dispersed to multiple users 123, i.e., the particular users who have accepted the social agreement. In some implementations, the bonus incentive may be dispersed to one user. For example, upon the second user and not the third user performing a majority of the activities from the set of activities within 5 hours, the second user may be provided/dispersed a bonus incentive of 30 coins instead of the third user.

In some implementations, incentive interface component 108 may be configured to determine whether user 123 who defines the social agreement, and thus the incentive, holds the incentive in their user inventory. Determination of whether the user inventory holds the incentive may be subsequent to definition of the incentive. By way of non-limiting illustration, incentive interface component 108 may determine whether the first user holds the incentive in the user inventory associated with the first user. In some implementations, upon determination that the user, e.g., the first user, does not hold the incentive defined, incentive interface component 108 may be configured to generate an incentive suggestion based on the in-game currency and the in-game virtual items in the user inventory. That is, the incentive suggestion may be one of the in-game currency and the in-game virtual items held in the user inventory. Subsequently, incentive interface component 108 may be configured to effectuate presentation of the incentive suggestion via incentive interface 112. In implementations where the bonus incentive is selected or entered, a similar determination may be performed for the bonus incentive to verify that users 123 holds the bonus incentive in their inventory.

Presentation effectuation component 110 may be configured to effectuate presentation of information, including but not limited to social agreements, to one or more users. The presentations may be effectuated via the online gaming platforms 105 to respective client computing platforms 104 such as client computing platform 104 associated with the second user. In some implementations, presentation effectuation component 110 may be configured to effectuate, via online gaming platforms 105, presentation of messages. In some implementations, the message may provide the information related to the bonus incentive, the bonus trigger, and/or other messages. In some implementations, the presentation of the message may be effectuated at the time of providing the incentive or with the social agreement.

Instruction initiation component 114 may be configured to receive indications of acceptance to form the social agreements. The indications of acceptance may be received from client computing platforms 104 associated with the other users 123 presented with the social agreements. The indications of acceptance may be received from client computing platforms 104 via network 113. By way of non-limiting illustration, an indication of acceptance to the social agreement may be received from client computing platform 104 associated with the second user. In some implementations, operations by instruction initiation component 114 that are related to receiving indications of acceptance(s) by particular users may be attributed to a separate instruction component referred to as an acceptance component.

Instruction initiation component 114 may be configured to generate sets of instructions to form the social agreements, e.g., as smart contracts. The sets of instructions may be generated responsive to receipt of the indications of acceptance. In some implementations, the smart contracts may be added to and/or recorded on (one or more blocks of) blockchain 117 implemented by decentralized ledger server 122. For example, a blockchain, such as blockchain 117, is a type of ledger, as well as a type of decentralized database that records rights pertaining to digital assets, transactions, and/or other information. In some implementations, operations by instruction initiation component 114 that are related to generating sets of instructions may be attributed to a separate instruction component referred to as an instruction generation component.

By way of non-limiting illustration, a set of instructions may be generated to form the social agreement between the first user and the second user as a smart contract. Instruction initiation component 114 may be configured to transfer/transmit the generated sets of instructions to decentralized ledger server 122 for execution by blockchain 117, and, as a result, recording the smart contract on blockchain 117. By way of non-limiting illustration, the set of instructions may be transferred to decentralized ledger server 122. In some implementations, operations by instruction initiation component 114 that are related to transferring sets of instructions may be attributed to a separate instruction component referred to as a transfer component.

In some implementations, user behavior monitoring component 128 may be configured to monitor the activities and the behavior patterns of users 123 of online gaming platforms 105, e.g., to determine the performance of the set of activities by users 123 within online gaming platforms 105. The performance of the set of activities or part thereof may be referred to as the performance information determined by user behavior monitoring component 128 and/or other sources. The user behaviors may be monitored in an ongoing manner. The term "ongoing manner" as used herein may refer to continuing to perform an action (e.g., monitor) periodically (e.g., every 30 seconds, every minute, every hour, etc.) until receipt of an indication to terminate. For example, the indication to terminate may include powering off client computing platform 104, selection by individual users to opt-out of their behavior patterns being monitored, and/or other indications of termination. By way of non-limiting illustration, user behavior monitoring component 128 may monitor the activities and the behavior patterns of the second user to determine performance of the set of activities by the second user.

Incentive providing component 120 may be configured to receive performance information indicating performance of the set of activities. The performance information may be received from user behavior monitoring component 128, online gaming platforms 105, and/or other source. By way of non-limiting illustration, performance information may be received from user behavior monitoring component 128 that indicates performance of the set of the activities by one or more particular users, e.g., the second user.

Incentive providing component 120 may be configured to provide, responsive to receiving performance information indicating the performance, the incentive to one or more users 123, e.g., in accordance with one or more particular social agreements. Providing the incentive to other users 123 where the incentive is an in-game virtual item may include transferring ownership rights from one user to another user. By way of non-limiting illustration, the incentive (e.g., a virtual sword), may be provided to the second user in accordance with a particular social agreement, and responsive to receipt of pertinent performance information. Thus, the ownership rights to the virtual sword may be transferred to the second user. The transfer of the ownership rights may be automatically executed by a particular smart contract recorded on blockchain 117, e.g., as a transaction on blockchain 117.

In some implementations, incentive interfaces 112 may enable the users 123 to define a performance deadline value for the set of activities. A performance deadline may be a date and time by which the set of activities must be performed by to receive the incentive. In some implementations, the incentive may be divisible. Thus, a portion, instead of all, of the in-game currency or the in-game virtual item may be provided. The term "portion" does not imply or require a percentage or ratio, but rather is intended to signify that recipients (i.e., the users that agree to perform the set of activities for the incentive) receive something of value and/or use. For example, a portion of an $80 incentive or a portion of a set of virtual wooden logs. In some implementations, the incentive provided may be proportional to ones of the set of activities performed by the other user (e.g., the second user) by the performance deadline value.

In some implementations, incentive providing component 120 may be configured to determine the portion of the incentive to provide to other user 123. The portion may be determined based on performance information (e.g., from user behavior monitoring component 128) indicating ones of the set of activities performed by the other user. By way of non-limiting illustration, upon the second user performing half of the set of activities by the performance deadline value, half of the incentive (e.g., half of $100) may be provided to the second user. In some implementations, given a lack of the performance deadline, the remaining portion of the incentive may be provided upon performance of the remaining set of activities. In some implementations, individual activities may be worth different portions of the incentive. For example, performing a first activity from the set of the activities may provide the second user with a first portion of the incentive and performing a second activity from the set of activities may provide the second user with a second portion of the incentive that is larger than the first portion. Incentive providing component 120 may be configured to provide corresponding portions of the incentive to the second user based on which activities of the set of activities have been performed as indicated by the performance information obtained by user behavior monitoring component 128, obtained from online gaming platform 105, and/or other sources.

In some implementations, the functionality of incentive providing component 120 may be executed by a particular smart contract recorded to blockchain 117. The particular smart contract may automatically receive (particular and/or pertinent) performance information from user behavior monitoring component 128, online gaming platforms 105, and/or other source and, in responsive, autonomously and/or automatically transfer ownership rights in accordance with the agreement embedded within the particular smart contract. In some implementations, the particular smart contract may determine the portions of the incentive to provide based on the received performance information, and/or transfer virtual currency based on the performance information, and/or otherwise provide the incentive in accordance with the agreement embedded within the particular smart contract.

Instructions component 124 of decentralized ledger server 122 may be configured to receive the sets of instructions. Subsequently, instructions component 124 may be configured to execute the sets of instructions, e.g., to record the social agreements on blockchain 117 as smart contracts, or to record transactions on blockchain 117, and/or to invoke functions stored on blockchain 117. By way of non-limiting illustration, the set of instructions may be received and executed to record the smart contract on blockchain 117. In some implementations, once a smart contract has been added to a blockchain, the smart contract may be referred to as published, posted, registered, and/or recorded.

Elements of blockchain 117 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain 117 may be publicly accessible and append-only. In some implementations, existing blocks of blockchain 117 can substantially not be altered or deleted, unless multiple copies are altered. This is unlikely to happen provided that the multiple copies stored on different computing platforms, e.g., in different geographical locations. Blockchain 117 may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

FIG. 3 illustrates an example implementation of an incentive interface 300 as may be used by system 100, in accordance with one or more implementations. Incentive interface 300 may enable users to define social agreements and send the defined social agreements to other one or more other users. Incentive interface 300 may include activities section 312, incentive section 314, and/or other sections. Activities section 312 may enable a particular user (e.g., the first user as described in relation to FIG. 1) to specify the set activities for other users, such as the second user, to perform. Specifying the set of activities via activities section 312 may be facilitated by user interface elements (e.g., a dropdown menu for building a particular object). Incentive section 314 may include user interface elements that enable the first user to select incentive(s) to be provided to the second user (e.g., a particular item from the first user's inventory) upon performance of the set of activities specified in activities section 312 (e.g., building a particular object). Incentive section 314 may include an option 313 to add a bonus incentive and a bonus trigger for the bonus incentive as described elsewhere in this disclosure. In some implementations, the user interface elements may include a custom/other option that may enable the users to define an activity and/or option not presented. Incentive interface 300 may include a virtual button 316 that initiates transmission of the (defined) social agreement to the intended recipients (e.g., the second user) in accordance with a recipient section 318.

Figure 4:
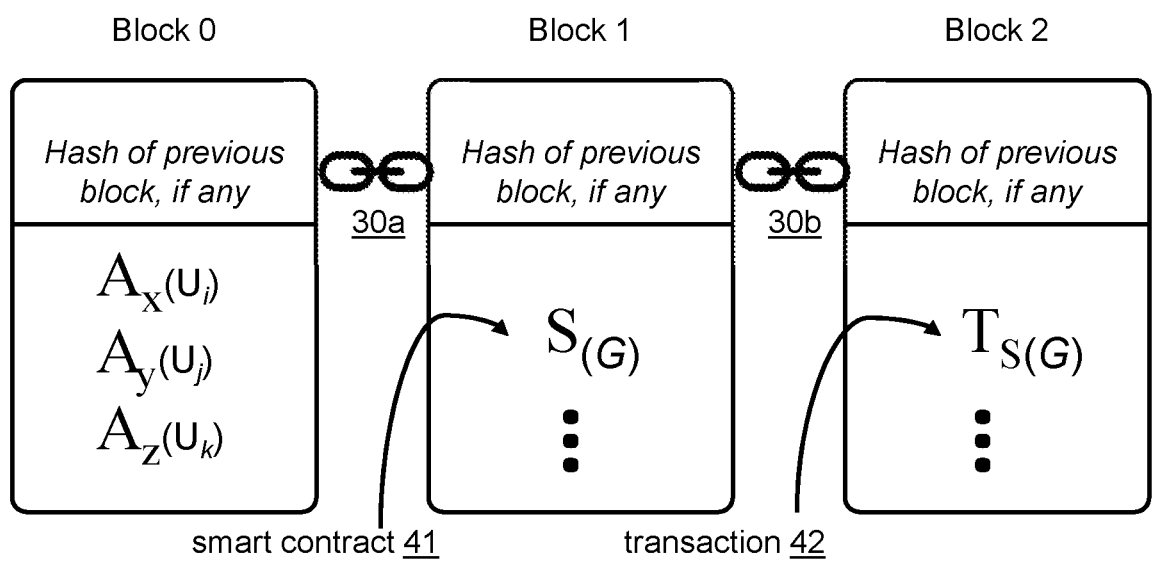
FIG. 4 illustrates a blockchain, as may be used by a system configured to enable users to incentivize one or more of particular in-game user behaviors and particular user activities for other users within an online game, in accordance with one or more implementations.

FIG. 4 illustrate exemplary blockchain 117a as may be used by system 100, in accordance with one or more implementations. FIG. 4 illustrates a blockchain 117a that includes a block 0, a block 1, and a block 2. As time progresses, more blocks may be added to blockchain 117a. The blocks within blockchain 117a are ordered. In block 0, three assets (indicated by a capital "A") are generated and/or assigned to three users or participants: a first digital asset, $A_x$, is assigned to user i ($U_i$), a second digital asset, $A_y$, is assigned to user j ($U_j$), and a third digital asset, $A_z$, is assigned to user k ($U_k$).

For example, the assets in block 0 may be individual ownership rights recorded for particular digital assets within an online gaming platform. Block 1 is connected to block 0 (as indicated by a link 30a), for example by including an address of block 1 in block 0, or vice versa. Likewise, block 1 is connected to block 2, as indicated by a link 30b.

In block 1, a smart contract 41 (indicated by a capital "S") is posted. For example, smart contract 41 may have been generated by a component similar to instructions component 124 (shown in FIG. 1), and may have been posted to blockchain 117a by a component similar to instructions component 124. Smart contract 41 may define a social agreement G. In some implementations, smart contract 41 may be recorded on blockchain 117a as soon as one or more (or all) users, e.g., the second user as described in relation to FIG. 1, accept social agreement G as defined (e.g., by the first user as described in relation to FIG. 1). In some implementations, smart contract 41 may be appended to a distributed blockchain as soon as all intended users participating in social agreement G have accepted the agreement as defined, a set of activities has been defined, and an incentive has been defined. In some implementations, smart contract 41 may include and/or otherwise hold or control the defined incentive, as if under escrow.

In block 2, a transaction 42 (indicated by a capital "T") may be recorded, using a blockchain address that corresponds to a particular function of smart contract 41. For example, transaction 42 may have been posted to blockchain 117a by a component similar to instructions component 124 (shown in FIG. 1). For example, instructions component 124 may post transaction 42 in response to receiving particular performance information, e.g., from user behavior monitoring component 128. Smart contract 41 may execute the particular function (corresponding to transaction 42) to transfer the incentive to a particular user (e.g., the second user), thereby providing the incentive in accordance with the social agreement between the first user and the second user.

Referring to FIG. 1, in some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, external providers of computation and/or storage services, and/or other resources. In some implementations, some or all of the functionality attributed herein to external resources 132 may be provided by resources included in system 100.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 107, 108, 110, 114, 120, 124 and/or 128, and/or other components. Processor(s) 136 may be configured to execute components 107, 108, 110, 114, 120, 124 and/or 128, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 107, 108, 110, 114, 120, 124 and/or 128 are illustrated in FIG. 1 as being implemented within a single processing unit, in implementations in which processor(s) 136 includes multiple processing units, one or more of components 107, 108, 110, 114, 120, 124 and/or 128 may be implemented remotely from the other components. The description of the functionality provided by the different components 107, 108, 110, 114, 120, 124 and/or 128 described below is for illustrative purposes, and is not intended to be limiting, as any of components 107, 108, 110, 114, 120, 124 and/or 128 may provide more or less functionality than is described. For example, one or more of components 107, 108, 110, 114, 120, 124 and/or 128 may be eliminated, and some or all of its functionality may be provided by other ones of components 107, 108, 110, 114, 120, 124 and/or 128. As another example, processor(s) 136 may be configured to execute one or more additional components that may perform some or all of the functionality attributed below to one of components 107, 108, 110, 114, 120, 124 and/or 128.

Figure 2:
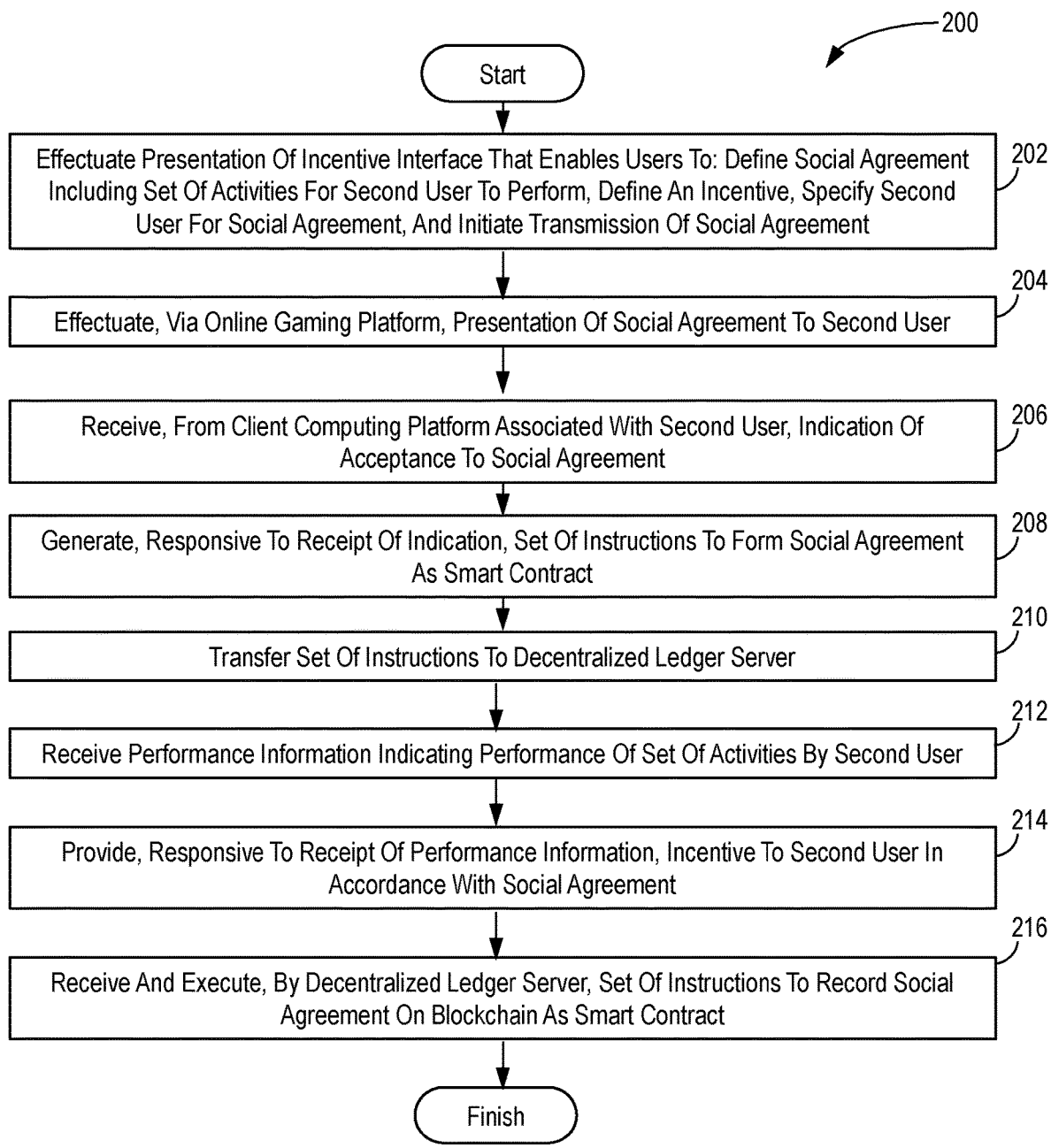
FIG. 2 illustrates a method to enable users to incentivize one or more of particular in-game user behaviors and particular user activities for other users within an online game, in accordance with one or more implementations.

FIG. 2 illustrates a method 200 to enable users to incentivize one or more of particular in-game user behaviors and particular user activities for other users within an online game, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include effectuating presentation of an incentive interface that enables users to: define a social agreement including a set of activities for a second user to perform, define an incentive, specify the second user for the social agreement, and initiate transmission of the social agreement to the second user. The social agreement may be transmitted to a client computing platform associated with the second user. Operation 202 may be performed by one or more hardware processors configured by machine-readable instructions including a component that is the same as or similar to incentive interface component 108, in accordance with one or more implementations.

An operation 204 may include effectuating, via an online gaming platform, presentation of the social agreement to the second user. Operation 204 may be performed by one or more hardware processors configured by machine-readable instructions including a component that is the same as or similar to presentation effectuation component 110, in accordance with one or more implementations.

An operation 206 may include receiving, from the client computing platform associated with the second user, indication of acceptance to the social agreement. Operation 206 may be performed by one or more hardware processors configured by machine-readable instructions including a component that is the same as or similar to instruction initiation component 114, in accordance with one or more implementations.

An operation 208 may include generating, responsive to receipt of the indication, a set of instructions to form the social agreement as a smart contract. Operation 208 may be performed by one or more hardware processors configured by machine-readable instructions including a component that is the same as or similar to instruction initiation component 114, in accordance with one or more implementations.

An operation 210 may include transferring the set of instructions to a decentralized ledger server. Operation 210 may be performed by one or more hardware processors configured by machine-readable instructions including a component that is the same as or similar to instruction initiation component 114, in accordance with one or more implementations.

An operation 212 may include receiving performance information indicating performance of the set of activities by the second user. Operation 212 may be performed by one or more hardware processors configured by machine-readable instructions including a component that is the same as or similar to incentive providing component 120, in accordance with one or more implementations.

An operation 214 may include providing, responsive to the receipt of the performance information, the incentive to the second user in accordance with the social agreement. Operation 214 may be performed by one or more hardware processors configured by machine-readable instructions including a component that is the same as or similar to incentive providing component 120, in accordance with one or more implementations.

An operation 216 may include receiving and executing, by the decentralized ledger server, the set of instructions to record the social agreement on a blockchain as the smart contract (and/or execute the smart contract). Operation 216 may be performed by one or more hardware processors configured by machine-readable instructions including a component that is the same as or similar to instructions component 124, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to enable users to incentivize particular in-game user activities for other users within an online game, the system comprising:
   one or more processors configured by machine-readable instructions to:
      effectuate presentation of an incentive interface that enables a first user to:
         (a) define a set of in-game activities for a second user to perform within the online game,
         (b) define an incentive for the set of in-game activities that the second user earns for performance of the set of in-game activities within the online game, wherein the incentive includes one or more of in-game currency and in-game virtual items held by the first user in a user inventory associated with the first user,
         (c) specify the second user to propose the set of in-game activities and the incentive to, and
         (d) initiate transmission of a social agreement to a client computing platform associated with the second user, wherein the social agreement corresponds to the set of in-game activities and the incentive defined;
      effectuate, via an online gaming platform, presentation of the social agreement to the second user;
      receive, from the client computing platform associated with the second user, indication of acceptance, by the second user, to the social agreement;
      generate, responsive to receipt of the indication, a set of instructions to form the social agreement as a smart contract and to record the smart contract on a decentralized ledger, wherein the smart contract includes executable code configured to be executed by the decentralized ledger;
      transfer the set of instructions to a decentralized ledger server, wherein the decentralized ledger server implements the decentralized ledger, and wherein execution of the set of instructions effectuates recording the smart contract on the decentralized ledger;
      determine whether the first user controls ownership of the incentive;
      responsive to determining the first user controls the ownership of the incentive, receive the incentive;
      place the incentive in the smart contract such that the smart contract controls the ownership of the incentive and further such that the first user no longer controls the ownership of the incentive;
      receive, from the online gaming platform, performance information indicating performance of the set of in-game activities by the second user within the online game; and
      responsive to receipt of the performance information, effectuate execution of the executable code included in the smart contract, wherein the execution of the executable code provides the incentive to the second user in accordance with the social agreement; and
   the decentralized ledger server comprising one or more processors configured by machine-readable instructions to:
      receive and execute the set of instructions to record the social agreement on the decentralized ledger as the smart contract.

2. The system of claim 1, wherein the incentive interface enables selection and/or entry of changes to patterns of one or more in-game activities as the set of in-game activities for the social agreement.

3. The system of claim 2, wherein the changes include at least one of:
   (a) increasing time spent on the online gaming platform,
   (b) increasing time spent playing a game via the online gaming platform during a particular time of day,
   (c) increasing time spent playing a particular level of the game via the online gaming platform, and
   (d) increasing in-game victories frequency.

4. The system of claim 2, wherein the in-game activities include at least one of:
   (a) collecting a particular amount or number of a particular virtual item within the online gaming platform,
   (b) collecting a particular amount or number of a particular type of virtual item within the online gaming platform,
   (c) attempting to complete a particular level or beat a particular opponent of a game within the online gaming platform,
   (d) discovering a given virtual item within the online gaming platform,
   (e) decreasing amount of time spent playing a particular level of a game to a particular amount of time, and
   (f) building a particular virtual object.

5. The system of claim 1, wherein the one or more processors are further configured by the machine-readable instructions to:
   subsequent to definition of the incentive, determine whether the first user holds the incentive in the user inventory;
   upon determination that the first user does not hold the incentive defined, generate an incentive suggestion based on the in-game currency and the in-game virtual items in the user inventory; and
   effectuate presentation of the incentive suggestion via the incentive interface.

6. The system of claim 1, wherein the incentive is divisible, wherein the incentive provided is proportional to ones of the set of in-game activities performed by the second user within the online game, wherein the one or more processors are further configured by machine-readable instructions to:
   determine a portion of the incentive to provide to the second user based on the performance information indicating ones of the set of in-game activities performed by the second user within the online game.

7. The system of claim 1, wherein the performance information indicating performance of the set of in-game activities by the second user within the online game is obtained from a user behavior monitoring component configured to monitor in-game activities of the second user to determine performance of the set of in-game activities by the second user within the online game.

8. A method to enable users to incentivize particular in-game user activities for other users within an online game, the method comprising:

effectuating presentation of an incentive interface that enables a first user to:
(a) define a set of in-game activities for a second user to perform within the online game,
(b) define an incentive for the set of in-game activities that the second user earns for performance of the set of in-game activities within the online game, wherein the incentive includes one or more of in-game currency and in-game virtual items held by the first user in a user inventory associated with the first user,
(c) specify the second user to propose the set of in-game activities and the incentive to, and
(d) initiate transmission of a social agreement to a client computing platform associated with the second user, wherein the social agreement corresponds to the set of in-game activities and the incentive defined;

effectuating, via an online gaming platform, presentation of the social agreement to the second user;

receiving, from the client computing platform associated with the second user, indication of acceptance, by the second user, to the social agreement;

generating, responsive to receipt of the indication, a set of instructions to form the social agreement as a smart contract and to record the smart contract on a decentralized ledger, wherein the smart contract includes executable code configured to be executed by the decentralized ledger;

transferring the set of instructions to a decentralized ledger server, wherein the decentralized ledger server implements the decentralized ledger, and wherein execution of the set of instructions effectuates recording the smart contract on the decentralized ledger;

determining whether the first user controls ownership of the incentive;

responsive to determining the first user controls the ownership of the incentive, receiving the incentive;

placing the incentive in the smart contract such that the smart contract controls the ownership of the incentive and further such that the first user no longer controls the ownership of the incentive;

receiving, from the online gaming platform, performance information indicating performance of the set of in-game activities by the second user within the online game;

responsive to receipt of the performance information, effectuating execution of the executable code included in the smart contract, wherein the execution of the executable code provides the incentive to the second user in accordance with the social agreement; and receiving and executing, by the decentralized ledger server, the set of instructions to record the social agreement on the decentralized ledger as the smart contract.

9. The method of claim 8, wherein the incentive interface enables selection and/or entry of changes to patterns of one or more in-game activities as the set of in-game activities for the social agreement.

10. The method of claim 9, wherein the changes include at least one of:
(a) increasing time spent on the online gaming platform,
(b) increasing time spent playing a game via the online gaming platform during a particular time of day,
(c) increasing time spent playing a particular level of the game via the online gaming platform, and
(d) increasing in-game victories frequency.

11. The method of claim 9, wherein the in-game activities include at least one of:
(a) collecting a particular amount or number of a particular virtual item within the online gaming platform,
(b) collecting a particular amount or number of a particular type of virtual item within the online gaming platform,
(c) attempting to complete a particular level or beat a particular opponent of a game within the online gaming platform,
(d) discovering a given virtual item within the online gaming platform,
(e) decreasing amount of time spent playing a particular level of a game to a particular amount of time, and
(f) building a particular virtual object.

12. The method of claim 8, further comprising:
subsequent to definition of the incentive, determining whether the first user holds the incentive in the user inventory;
upon determination that the first user does not hold the incentive defined, generating an incentive suggestion based on the in-game currency and the in-game virtual items in the user inventory; and
effectuating presentation of the incentive suggestion via the incentive interface.

13. The method of claim 8, wherein the incentive is divisible, wherein the incentive provided is proportional to ones of the set of in-game activities performed by the second user within the online game, further comprising:
determining a portion of the incentive to provide to the second user based on the performance information indicating ones of the set of in-game activities performed by the second user within the online game.

14. The method of claim 8, wherein the performance information indicating performance of the set of in-game activities by the second user within the online game is obtained from a user behavior monitoring component configured to monitor in-game activities of the second user to determine performance of the set of in-game activities by the second user within the online game.

* * * * *